United States Patent
Hall et al.

(10) Patent No.: US 6,184,292 B1
(45) Date of Patent: Feb. 6, 2001

(54) SOFT GEL POLYMERS FOR HIGH TEMPERATURE USE

(75) Inventors: James E. Hall, Mogadore; Xiaorong Wang, Akron, both of OH (US); Hideo Takeichi, Kodaira; Naruhiko Mashita, Yokohama, both of (JP)

(73) Assignee: Bridgestone Corporation, Tokyo (JP)

( * ) Notice: Under 35 U.S.C. 154(b), the term of this patent shall be extended for 0 days.

(21) Appl. No.: 09/166,368

(22) Filed: Oct. 5, 1998

(51) Int. Cl.$^7$ ..................................................... C08F 8/30
(52) U.S. Cl. .......................... 525/185; 524/505; 525/92
(58) Field of Search .................. 524/505; 525/185, 525/92

(56) References Cited

U.S. PATENT DOCUMENTS

| | | |
|---|---|---|
| 2,725,367 | 11/1955 | Niederhauser et al. . |
| 2,971,934 | 2/1961 | Brown et al. . |
| 3,244,664 | 4/1966 | Zelinski et al. . |
| 3,281,383 | 10/1966 | Zelinski et al. . |
| 3,297,654 | 1/1967 | Barr et al. . |
| 3,414,551 | 12/1968 | Reid et al. . |
| 3,428,596 | 2/1969 | Strand et al. . |
| 3,480,580 | 11/1969 | Joyner et al. . |
| 3,481,910 | 12/1969 | Brunson . |
| 3,492,227 | 1/1970 | Kolaian . |
| 3,528,936 | 9/1970 | Kent et al. . |
| 3,577,365 | 5/1971 | Folzenlogen et al. . |
| 3,594,452 | 7/1971 | De La Mare et al. . |
| 3,751,378 | 8/1973 | Cowperthwaite et al. . |
| 3,761,458 | 9/1973 | Holler et al. . |
| 3,796,687 | 3/1974 | Collette et al. . |
| 3,840,449 | 10/1974 | Furukawa et al. . |
| 3,862,265 | 1/1975 | Steinkamp et al. . |
| 3,970,608 | 7/1976 | Furukawa et al. . |
| 3,985,830 | 10/1976 | Fetters et al. . |
| 3,998,907 | 12/1976 | DiGiulio . |
| 4,015,612 | 4/1977 | Pavlik et al. . |
| 4,017,669 | 4/1977 | Collette et al. . |
| 4,087,485 | 5/1978 | Huff . |
| 4,104,332 | 8/1978 | Zelinski et al. . |
| 4,132,531 | 1/1979 | Cummings et al. . |
| 4,139,417 | 2/1979 | Marie et al. . |
| 4,151,336 | 4/1979 | Sackmann et al. . |
| 4,151,337 | 4/1979 | Kanoh et al. . |
| 4,287,314 | 9/1981 | Fava . |
| 4,304,886 | 12/1981 | Bean, Jr. et al. . |
| 4,374,951 | 2/1983 | Lee et al. . |
| 4,404,321 | 9/1983 | Abolins et al. . |
| 4,404,322 | 9/1983 | Saito et al. . |
| 4,408,010 | 10/1983 | Le-Khac . |
| 4,423,196 | 12/1983 | Arlt et al. . |
| 4,427,828 | 1/1984 | Hergenrother et al. . |
| 4,502,229 | 3/1985 | Kitzman . |
| 4,506,056 | 3/1985 | Gaylord . |
| 4,540,753 | 9/1985 | Cozewith et al. . |
| 4,585,824 | 4/1986 | Uchida et al. . |
| 4,605,700 | 8/1986 | Le-Khac . |
| 4,683,275 | 7/1987 | Kato et al. . |
| 4,728,463 | 3/1988 | Sutker et al. . |
| 4,732,928 | 3/1988 | Mizushiro et al. ................... 524/505 |
| 4,735,992 | 4/1988 | Nogues et al. . |
| 4,771,097 | 9/1988 | Sackmann et al. . |
| 4,772,657 | * 9/1988 | Akiyama et al. ....................... 525/92 |
| 4,889,896 | 12/1989 | Canova et al. . |
| 4,893,055 | 1/1990 | Fuzii et al. . |
| 4,912,144 | 3/1990 | McCready . |
| 4,921,910 | 5/1990 | Lunt et al. . |
| 4,931,502 | 6/1990 | McCready . |
| 4,996,262 | 2/1991 | Pyke et al. . |
| 5,008,324 | 4/1991 | Killgoar, Jr. et al. . |
| 5,034,449 | 7/1991 | Mallikarjun . |
| 5,037,924 | 8/1991 | Tazi et al. . |
| 5,082,913 | 1/1992 | Tazi et al. . |
| 5,122,161 | 6/1992 | Benfaremo et al. . |
| 5,126,403 | 6/1992 | Graiver et al. . |
| 5,156,920 | 10/1992 | Aycock et al. . |
| 5,202,384 | 4/1993 | Pyke et al. . |
| 5,212,227 | 5/1993 | Sakazume et al. . |
| 5,219,628 | 6/1993 | Hathaway et al. . |
| 5,225,498 | 7/1993 | Sorathia et al. . |
| 5,244,971 | 9/1993 | Jean-Marc . |
| 5,318,854 | 6/1994 | Hamersma et al. . |
| 5,356,953 | 10/1994 | Harada et al. . |
| 5,373,048 | 12/1994 | Witzeman et al. . |
| 5,414,044 | 5/1995 | Moriya et al. . |
| 5,432,662 | 7/1995 | Kato et al. . |

(List continued on next page.)

FOREIGN PATENT DOCUMENTS

| | | |
|---|---|---|
| 47913/85 | 4/1986 | (AU) . |
| 702610 | 1/1965 | (CA) . |
| 34 30 802 A1 | 3/1986 | (DE) . |
| 42 25 875 A1 | 2/1994 | (DE) . |
| 42 39 437 A1 | 5/1994 | (DE) . |
| 42 41 538A1 | 6/1994 | (DE) . |
| 4241538A1 | 6/1994 | (DE) . |
| 0 177 401 A1 | 4/1986 | (EP) . |
| 0 322 905 A2 | 7/1989 | (EP) . |
| 0 408 470 A1 | 1/1991 | (EP) . |
| 0 440 922 A1 | 8/1991 | (EP) . |
| 0 536 753 A1 | 10/1992 | (EP) . |
| 0 728 767 A1 | 8/1996 | (EP) . |
| 922151 | 3/1963 | (GB) . |
| 952151 | 3/1964 | (GB) . |
| 60-243102 | of 1985 | (JP) . |
| 6-248017 | of 1994 | (JP) . |
| 6-56921 | of 1994 | (JP) . |
| 8-255901 | of 1996 | (JP) . |
| WO 96/23007 | 8/1996 | (WO) . |
| WO 97/00898 | 1/1997 | (WO) . |

Primary Examiner—Edward J. Cain
(74) Attorney, Agent, or Firm—David G. Burleson; Scott A. McCollister

(57) ABSTRACT

The instant invention provides a soft gel composition comprising a hydrogenated block copolymer, a polyphenylene ether and a substantially amorphous polyolefin or hydrogenated polydiene blended in respective proportions sufficient to provide the composition with a Shore A hardness of 30 or less, and a service temperature of up to, and including about 150° C.

24 Claims, No Drawings

U.S. PATENT DOCUMENTS

| | | |
|---|---|---|
| 5,472,741 | 12/1995 | Sackmann et al. . |
| 5,489,657 | 2/1996 | Sue et al. . |
| 5,494,964 | 2/1996 | Meichsner et al. . |
| 5,494,981 | 2/1996 | Gorodisher et al. . |
| 5,532,317 | 7/1996 | Shinmura et al. . |
| 5,536,774 | 7/1996 | Segatta . |
| 5,548,031 | 8/1996 | Doi . |
| 5,585,434 | 12/1996 | DeNicola, Jr. et al. . |
| 5,585,436 | 12/1996 | Niessner et al. . |
| 5,602,200 | 2/1997 | Wissmann . |
| 5,618,881 | 4/1997 | Hojabr . |
| 5,634,122 | 5/1997 | Loucks et al. . |
| 5,637,410 | 6/1997 | Bonner et al. . |
| 5,651,927 | 7/1997 | Auda et al. . |
| 5,652,307 | 7/1997 | Niessner et al. . |
| 5,654,364 | 8/1997 | Bates et al. . |
| 5,655,820 | 8/1997 | Kervagoret . |
| 5,658,985 | 8/1997 | Eichenauer et al. . |
| 5,665,820 | 9/1997 | Leistner et al. . |
| 5,670,006 | 9/1997 | Wilfong et al. . |
| 5,684,122 | 11/1997 | Inoue et al. . |
| 5,691,411 | 11/1997 | Khouri et al. . |
| 5,710,228 | 1/1998 | Krause et al. . |
| 5,776,234 | 7/1998 | Schilling . |
| 5,783,630 | 7/1998 | Evans et al. . |
| 5,798,413 | 8/1998 | Spelthann et al. . |
| 5,821,032 | 10/1998 | DoMinh . |
| 5,869,695 | 2/1999 | Ulmer et al. . |
| 5,883,188 | 3/1999 | Hwang et al. . |
| 5,905,116 | 5/1999 | Wang et al. . |
| 5,912,296 | 6/1999 | Wang et al. . |
| 5,965,666 | 10/1999 | Koo et al. . |

\* cited by examiner

SOFT GEL POLYMERS FOR HIGH TEMPERATURE USE

FIELD OF THE INVENTION

The present invention relates to hydrogenated block copolymer containing gel compositions being superior in high-temperature (100° C.) compression set, mechanical strength and moldability, having utility at temperatures up to 150° C. and being useful as a molding material for various molded products.

BACKGROUND OF THE INVENTION

It is extremely desirable to develop thermoplastic elastomers of a rubber-like soft material, requiring no vulcanization, and having moldability like thermoplastic resins, for applications in the fields of automobile parts, household electric appliance parts, electric wire-protecting materials, medical appliance parts, miscellaneous goods, footwear, and the like. Various elastomer compositions containing the hydrogenated product of vinyl-substituted aromatic hydrocarbon/conjugated diene block copolymers (hereinafter referred to as hydrogenated block copolymer) have been used in thermoplastic elastomeric applications.

U.S. Pat. No. 5,710,206, to Francis et al, discloses gels containing block copolymers, polyphenylene ether and at least 500 parts of an extender oil per 100 parts by weight of the block copolymer. Such mixtures are too soft having low tensile strength and lower than desirable compression set.

WO 81/020020 discloses high-impact polyphenylene compositions comprising a polyphenylene ether resin, the hydrogenated block copolymer and an oil. The compositions obtained here provided thermoplastic resins having a good processability, but could not substantially provide thermoplastic elastomers superior in processability as well as compression set at 100° C.

Japanese Pat. 89-49423 B teaches a composition of polyphenylene ether (PPO), hydrogenated styrene/butadiene/styrene block copolymer (SEBS) and a non-aromatic oil; wherein the parts by weight per hundred parts by weight of rubber hydrocarbon (hereinafter "PHR") of SEBS is 100 PHR; the weight proportion of SEBSIPPO ranges from about 90/1~30/70; the PHR of non-aromatic oil is from about 10~300; and, the composition has a compression set of less than 65% at 100° C. Japanese Pat. 94-70162 B teaches a composition of PPO, SEBS and a non-aromatic oil; wherein the PHR of SEBS is about 100; the weight proportion of SEBS/PPO ranges from about 90/10~30/70; the weight proportion of non-aromatic oil to the sum of SEBS and PPO is greater than 0.43; and, the composition has a compression set of less than 65% at 100° C.

It has long been recognized that two or more polymers may be blended together to form a wide variety of random or structured morphologies to obtain products that potentially offer desirable combinations of characteristics. However, in many cases, it may be difficult or even impossible in practice to achieve many potential combinations through simple blending because of some inherent and fundamental problem. Frequently, the two polymers are thermodynamically immiscible, which precludes generating a truly homogeneous product. This immiscibility may not be a problem per se since often it is desirable to have a two-phase structure. However, the situation at the interface between these two phases very often does lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

The hydrogenated block copolymer-based thermoplastic elastomers produced according to the prior arts have a high-temperature (100° C.) compression set of 65% or more, do not reach the required level of high-temperature compression set for vulcanized rubber applications. Consequently, hydrogenated block copolymer-based thermoplastic elastomer compositions that are molded repeatedly without losing their excellent high-temperature (100° C.) compression set, often require the use of a fourth ingredient such as a polyolefin or polystyrene, or in other instances a curative such as a peroxide as shown in the prior art such as in U.S. Pat. No. 4,772,657, to Akiyama et al.

The use of low molecular weight oils, as required in the prior art to obtain soft gels, often results in an undesirable property, called bleeding; whereupon oil exudes to the surface of a molded part formed from such gels, resulting in potential contamination of the immediate area and increasing the hardness of the part. Furthermore, oils are readily extractable from a molded part containing oil when that part is bought into contact with cleaning fluids or aqueous solutions containing solvents or surfactants, thereby limiting the areas of use of such parts.

The present invention was made to solve the above problems that could not readily be solved with the conventional molding materials for elastomers. Particularly, it was found that thermoplastic elastomer compositions which can be processed easily and used repeatedly, and yet which are superior in high-temperature (100° C.) compression set, can be obtained by a simple blending technique.

OBJECTS OF THE INVENTION

Accordingly, it is an object of the instant invention to provide a soft gel that has utility at temperatures up to about 150° C.

More specifically, it is an object of this invention to provide a composition of hydrogenated styrene/butadiene/styrene block copolymer (SEBS), polyphenylene ether (PPO) and ethylene-propylene rubber (EPR) blended in proportions sufficient to provide a soft gel product having utility at temperature up to about 150° C.

Still more specifically, it is an object of this invention to provide a composition consisting essentially of SEBS, PPO and ethylene-propylene rubber (EPR) blended in proportions sufficient to provide product having utility as a super soft gel at temperature up to about 150° C.

Another object of the invention is to provide a relatively low molecular weight component composition of blended polymers that exhibit improved properties including: low Shore A hardness of less than about 30; high damping properties and a service temperature of up to about 150 ° C.; and are useful in the production of various other rubber compounds.

SUMMARY OF THE INVENTION

The present invention is most broadly directed to compositions useful in the manufacture of articles comprised of soft gels and having a service temperature of up to, and including, about 150° C.

More specifically, the primary object of the present invention under such circumstances is to provide a composition of hydrogenated block copolymer such as hydrogenated styrene/butadiene/styrene block copolymer (SEBS), polyphenylene ether (PPO) and ethylene-propylene rubber (EPR) blended in proportions specifically selected with respective weight proportions sufficient to provide a soft gel having: a service temperature of up to, and including, about 150° C. and a Shore A hardness of about 30 or less. The compositions of the invention have damping properties useful in producing molded products having heat resistance and a high elasticity and damping properties, such as industrial materials, electric and electronic materials, industrial construction materials, car parts, sporting goods, shoes, domestic electrical appliances, various mechanical parts, and the like.

DETAILED DESCRIPTION OF THE INVENTION

The present invention provides a hydrogenated block copolymer composition having a compression set (100° C.) of 65% or less which comprises:

(a) 100 parts by weight of a hydrogenated block copolymer obtained by hydrogenating a block copolymer comprising at least two polymer blocks A composed mainly of a vinyl-substituted aromatic hydrocarbon and at least one polymer block B composed mainly of a conjugated diene, (b) 10 to 150 parts by weight of a homopolymeric and/or copolymeric polyphenylene ether resin comprising a binding unit represented by the general formula,

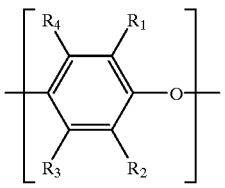

wherein $R_1$, $R_2$, $R_3$ and $R_4$, which may be the same or different, represent substituents selected from the group consisting of hydrogen, halogen, hydrocarbon groups and substituted hydrocarbon groups, and (c) 10 to 500 parts by weight of a substantially amorphous polyolefin such as ethylene-propylene rubber (EPR) or a hydrogenated polyolefin.

In the present invention, the hydrogenated block copolymer is obtained by hydrogenating a block copolymer comprising at least two polymer blocks A composed mainly of a vinyl-substituted aromatic hydrocarbon and at least one polymer block B composed mainly of a conjugated diene. This hydrogenated block copolymer has the polymer structure of hydrogenated products of vinyl-substituted aromatic hydrocarbon/conjugated diene block copolymers represented by the formulae such as for example $(A-B-)_{(n)}A$, $(B-A-B-)_{(n)}A$, $(B-A-B-)_{(n)}A-B$, $(A-B-)_{(m)}X$, $(B-A-B-)_{(m)}X$, etc., wherein n is an integer of 1 or more, m is an integer of 2 or more and X represents a coupling or polyfunctional initiator residue having two or more functional groups.

This hydrogenated block copolymer contains 5 to 60 wt. %, preferably 10 to 50 wt. % of a vinyl-substituted aromatic hydrocarbon. Referring now to its block structure, the polymer block A composed mainly of a vinyl-substituted aromatic hydrocarbon has the structure of the homopolymer block of a vinyl-substituted aromatic hydrocarbon or the copolymer block of a vinyl-substituted aromatic hydrocarbon containing more than 50 wt. %, preferably not less than 70 wt. % of vinyl-substituted aromatic hydrocarbon with a hydrogenated conjugated diene and the polymer block B composed mainly of a hydrogenated conjugated diene has the structure of the homopolymer block of a hydrogenated conjugated diene or the copolymer block of a hydrogenated conjugated diene containing more than 50 wt. %, preferably not less than 70 wt. % of hydrogenated conjugated diene with a vinyl-substituted aromatic hydrocarbon. Also, as to the distribution of the hydrogenated conjugated diene or the vinyl-substituted aromatic hydrocarbon contained in the molecular chains of the polymer block A composed mainly of a vinyl-substituted aromatic hydrocarbon and the polymer block B composed mainly of a hydrogenated conjugated diene, the both polymer blocks may take any of random, tapered (the monomer components increase or decrease along the molecular chain) and partial block arrangements and combinations thereof; and when the numbers of both said polymer blocks A and B are 2 or more, the structures of the respective polymer blocks may be the same or different.

The vinyl-substituted aromatic hydrocarbon constituting the hydrogenated block copolymer is one or more members selected from the group consisting of styrene, α-methylstyrene, vinyltoluene, and the like. Of these compounds, styrene is preferred. A conjugated diene before hydrogenation constituting the hydrogenated conjugated diene is one or more members selected from the group consisting of butadiene, isoprene, 1,3-pentadiene, 2,3-dimethyl-1,3-butadiene, etc. Of these, butadiene, isoprene and combination of the both are preferred. The polymer block composed mainly of a conjugated diene before hydrogenation may contain any amount, expressed by mole %, of the conjugated diene micro structure, and for example a polybutadiene block contains 5 to 90 mole %, preferably 10 to 50 mole percent of the 1,2-vinyl bond.

The hydrogenated block copolymer of the above structure used in the present invention has a number average molecular weight in a range of from 100,000 to 1,000,000, preferably from 125,000 to 800,000, more preferably 150,000 to 500,000, and the molecular weight distribution ratio ($M_w/M_n$) of weight average molecular weight ($M_w$) to number average molecular weight ($M_n$) is 10 or less. The molecular structure type of the hydrogenated block copolymer may be any of straight-chain, branched involving partial coupling with a coupling agent, radial and the star-shaped types and combinations thereof There is no limitation to a method for producing these hydrogenated block copolymers, so far as they have the structure described above. These copolymers can be obtained by synthesizing a vinyl-substituted aromatic hydrocarbon/conjugated diene block copolymer in an inert solvent using an organo-lithium and if necessary, a 1,2-vinyl bond modifier such as ether compounds, tertiary amines, etc. according to the methods, for example, disclosed in British Pat. No. 1,130,770 and U.S. Pat. Nos. 3,281,383 and 3,639, 517, and then hydrogenating the resulting block copolymer according to the well-known methods, for example, disclosed in British Pat. No. 1,020,720 and U.S. Pat. Nos. 3,333,024 and 4,501,857. In this case, the polymer block composed mainly of the conjugated diene can be changed in form to the polymer block of an olefinic compound by hydrogenating at least 80 mole % of the aliphatic double bond coming from the conjugated diene of the vinyl-substituted aromatic hydrocarbon/conjugated diene block copolymer.

Also, there is no particular limitation to the hydrogenation ratio of the aromatic double bond coming from the polymer block A composed mainly of the vinyl-substituted aromatic hydrocarbon and the vinyl-substituted aromatic hydrocarbon which has been incorporated as a co-monomer, as need arises, in the polymer block B composed mainly of the conjugated diene, but the hydrogenation ratio is preferably 20 mole % or less. The amount of unhydrogenated aliphatic double bonds contained in the hydrogenated block copolymer can easily be determined by infrared spectrophotometer, nuclear magnetic resonance apparatus, etc.

In the present invention, the polyphenylene ether resin (PPO) is essential to improve the high-temperature (100° C.) compression set. This resin is a homopolymer and/or copolymer comprising a binding unit represented by the general formula:

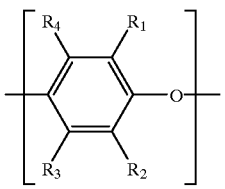

wherein $R_1$, $R_2$, $R_3$ and $R_4$, which may be the same or different, represent substituents selected from the group consisting of hydrogen, halogen, hydrocarbon groups and substituted hydrocarbon groups. The well-known polyphenylene ether resins (PPO) may be used, and examples of such resins include for example poly(2,6-dimethyl-1,4-phenylene ether), poly(2-methyl-6-ethyl-1,4-phenylene ether), poly(2,6-diphenyl-1,4-phenylene ether), poly(2-methyl-6-phenyl-1,4-phenylene ether), poly(2,6-dichloro-1,4-phenylene ether), and the like. Furthermore, copolymers of 2,6-dimethylphenol with other phenols (e.g. 2,3,6-trimethylphenol, 2-methyl-6-butylphenol) may also be used. Of these polymers, poly(2,6-dimethyl-1,4-phenylene ether) is preferably used.

The amount of the polyphenylene ether, blended is preferably selected from a range of from 10 to 150 parts by weight based on 100 parts by weight of the hydrogenated block copolymer. When the amount exceeds 150 parts by weight, the hardness of hydrogenated block copolymer compositions obtained is too high, so that the compositions lose flexibility to become resinous. While when the amount is less than 10 parts by weight, no improvement in high-temperature compression set due to the addition of the polyphenylene ether resin can be observed.

The polyphenylene ether resins component contemplated by the instant invention may be made according to the processes disclosed in U.S. Pat. Nos. 3,306,874, 3,306,875, 3,257,357 and 3,257,358.

Modified PPO is also optionally contemplated by the invention. It is formed by modifying the above-mentioned PPO by the use of a modifier. As the modifier used for modifying the PPO, there is used a compound having an ethylenic double bond and a polar group in the same molecule, which is specifically exemplified by maleic anhydride, maleic acid, maleic acid ester, maleimide, N-substituted compound thereof, acrylic acid, acrylic acid ester, methacrylic acid, methacrylic acid ester and glycidyl methacrylate, among which is preferably used maleic anhydride in particular.

In the present invention, the use of a substantially amorphous polyolefin such as ethylene-propylene rubber (EPR) or hydrogenated polydienes as component (c), is essential to obtain soft and rubber-like compositions. The EPR useful in the blends of this invention are substantially amorphous having less than 10% by weight of crystallinity. The EPR is formed from copolymerized monomers of ethylene, alpha-olefins, e.g., propylene, and, optionally, known DM's, e.g., 1,4-hexadiene and 5-ethylidene-2-norbornene. The weight average molecular weight range of these EPR polymers using styrene constants typically ranges between 5,000 and 60,000.

EPR is prepared by procedures known in the art. Examples of commercially available polymers are poly (propylene-co-ethylene) from Aldrich Chemical Company, Milwaukee, Wis. (Catalog Nos. 42819-1 and 42820-5), and TRILENE (poly(propylene-co-ethylene)) from Uniroyal Chemical Company.

These ethylene copolymers, terpolymers, tetrapolymers, etc., are readily prepared using soluble Ziegler-Natta catalyst compositions. For a review of the literature and patent art see: "Polyolefin Elastomers Based on Ethylene and Propylene", by F. P. Baldwin and G. VerStrate in Rubber Chem. & Tech. Vol. 45, No. 3, 709–881 (1972) and "Polymer Chemistry of Synthetic Elastomers", edited by Kennedy and Tornqvist, Interscience, New York, 1969. For more recent review see: "Elastomers, Synthetic (thylene-Propylene)" by E. L. Borg in Encyclopedia of Chemical Technology, 3d Ed., Vol. 8, 492–500 (Kirk-Othmer, 1979) and "Ethylene-Propylene Elastomers", by G. VerStrate in Encyclopedia of Polymer Science and Engineering, Vol. 6, 2d Ed., 522–564 (J. Wiley & Sons, 1986).

Suitable hydrogenated polydienes include but are not limited to hydrogenated polyisoprene and hydrogenated vinyl polybutadiene, however, any hydrogenated polydiene having a weight average molecular weight using styrene constants between 5,000 and 60,000 is suitable for use in the present invention.

Suitable polymers may be prepared in either batch or continuous reactor systems, in gas phase, solution or slurry polymerizations. In particular, effective use can be made of a tubular reactor system to achieve novel molecular composition and molecular weight distribution in accordance with U.S. Pat. No. 4,540,753, which is incorporated herein by reference. In common with all Ziegler-Natta polymerizations, monomers, solvents and catalyst components used in the present invention are dried and freed from moisture, oxygen or other constituents which are known to be harmful to the activity of the catalyst system. The feed tanks, lines and reactors may be protected by blanketing with an inert dry gas such as purified nitrogen. Chain propagation retarders or stoppers, such as hydrogen and anhydrous hydrogen chloride, may be fed continuously or intermittently, to any but the tubular reactor of U.S. Pat. No. 4,540,753, for the purpose of controlling the molecular weight and/or molecular weight distribution within the desired limits. Additionally, as described above, it is known to incorporate "branch suppressors" such as certain Lewis Bases, e.g., $NH_3$, and certain silicates, during the EPDM polymerization to reduce branching.

The amount of the ethylene-propylene rubber (EPR), component (c), blended is 10 to 500 parts by weight, preferably 100 to 400 parts by weight based on 100 parts by weight of the component (a). If the amount of the component (c) is less than 10 parts by weight, the resulting product becomes resin-like, increases its hardness and loses its flexibility. Additionally, the product itself can be considered not to be economical due to a small quantity in the use of cheap softening agent. If the component (c) is blended in a range of 10 to 400 parts by weight, a composition superior in the high-temperature (100° C.) compression set can be obtained.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl) phosphite, 2,6-di-t-butyl-4-methylphenol and the like. Examples of granular or powdery filler include talc, carbon black, graphite, titanium oxide, silica, mica, calcium carbonate, calcium sulfate, barium carbonate, magnesium carbonate, magnesium sulfate, barium sulfate, tin oxide, alumina, kaolin, silicon carbide, metallic powder, glass powder, glass flake and glass bead. These compounding ingredients are incorporated in suitable amounts depending upon the contemplated use of the product, preferably in the range of 1 to 350 parts of additives or compounding ingredients per 100 parts of soft gel.

A reinforcement may be defined as the material that is added to a resinous matrix to improve the strength of the soft gel. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products including Reostomer (produced by Riken-Vinyl Inc.), hydrogenated polystyrene-(medium or high 3,4)-polyisoprene-polystyrene block copolymers such as Hybler (produced by Kurare Inc.), polynorbomenes such as Norsorex (produced by Nippon Zeon Inc.) and the like.

A second softening agent may be added to further decrease the hardness of the composition. Paraffin oil or similar non-aromatic oil can be added at a level of no more than 25 parts per 100 parts of soft gel.

The above-mentioned filler is preferably surface-treated. The coupling agent to be used for the surface treatment is to improve adhesion between the filler and composition, and may be optionally selected for use from the well known silane-based coupling agents and titanium-based coupling agents. Examples of the preferably usable coupling agents among them include aminosilane such as δ-aminopropyltnimethoxysilane, N-β-(aminoethyl)-δ-aminopropyltrimethoxysilane, glycidoxypropyltrimethoxysilane and β-(3,4-epoxycyclohexyl) ethyltrimethoxysilane, epoxysilane, isopropyltriamino-ethyl titanate, and the like.

The soft gels produced according to the present invention generally have low to high damping properties having a tan δ in the range of about 0.1 to about 1.0, and a Shore A hardness ranging from 0 to about 50, preferably about 1 to about 30, most preferably about 5 to 20 at about 20° C. to 25° C. or at room temperature. The service temperature of the soft gels of the present invention is less than or equal to 150 ° C. for most of the blends of polymers of the present invention, e.g., 100 ° C. compression set of the soft gel is less than 80% and preferably less than 65% while the 70 ° C. compression set is less than 50% and preferably less than 30%.

The soft gel compositions of the present invention may be prepared by any means well known in the art for combining such ingredients, such as solution blending, milling, internal batch mixing, or continuous extrusion of a solid form of the soft gel compositions and the other ingredients. A rapid and convenient method of preparation comprises heating a mixture of the components to a temperature of about 50° C. to about 290° C.

The soft gels compositions of this invention can be manufactured by mixing and dynamically heat-treating the components described above, namely, by melt-mixing. As for the mixing equipment, any conventional, generally known equipment such as an open-type mixing roll, closed-type Banbury mixer, extruding machine, kneader, continuous mixer, etc., is acceptable. The closed-type is preferable, and mixing in an inactive gas environment, such as nitrogen or carbon dioxide, is also preferable. A Brabender mixer having a capacity of up to 300 gallon is most preferred.

The composition obtained using the manufacturing method of this invention can be molded with equipment conventionally used for molding thermoplastics. It is suitable for extrusion molding, calendar molding, and particularly injection molding. These compositions can also be solution mixed in appropriate solvent, e.g. cyclohexane or toluene.

As suggested above, the composition of the present invention can be mixed in any conventional mixer such as a Brabender mixer, Banbury mixer or roll mill or extruder normally conducted within the temperature range of about 250 ° C. to about 300° C., preferably maintaining the composition above its melting point for a few minutes up to several hours, preferably 10 to 40 minutes. A particularly useful technique is to add any fillers in the beginning of the mixing cycle in order to take maximum advantage of heating time and to prevent surface bleeding and overheating when forming the molded articles.

The resultant soft gel polymer composition may be molded in appropriate press ovens and the like to form products in the form of extruded pellets, cut dices, preferably as small as possible since smaller pellets provide short heating times and better flow when utilized in flow molding. Ground pellets may also be utilized. It is preferable to use injection molding techniques.

The soft gels of the instant invention can be used in high temperature applications or as a blending component in any other compositions typically used for their elastomeric properties.

In summary, the molded soft gel compositions of the present invention retain elastomeric characteristics and are useful in high temperature applications.

It is further important that these soft gels exhibit good mechanical and thermal stability, as parts prepared from the subject soft gels will be cycled through various environments and repeatedly exposed to various forces of compression, tension, bending, and the like.

The compositions of the present invention are favorably used in the manufacturing of any product in which the following properties are advantageous: a high degree of softness, heat resistance, decent mechanical properties and elasticity. The compositions of the present invention can be used in all industry fields, in particular, in the fabrication of automotive parts, household electrical appliances, industrial machinery, precision instruments, transport machinery, constructions, engineering, and medical instruments.

Representative examples of the uses of the instant soft gels are seals, vibration restraining materials and cushion gels. These uses involve connecting materials such as sealing materials, packing, gaskets and grommnets, supporting materials, such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, dryers, printers and ventilator fans. Further, these materials are also suitable for impact absorbing materials in audio equipment and electronic or electrical equipment, sporting goods and shoes. Further, as super low hardness rubbers, these materials are applicable for use in appliances, damping rubbers, and as low hardness plastics. Since the present compositions can be used to control the release of internal low molecular weight materials out from the compositions, it is useful as a release support to emit materials such as fragrance materials, medical materials and other functional materials. The compositions of the present invention also possess utility in applications of use in liquid crystals, adhesive materials and coating materials.

In the following, the present invention will be described in more detail with reference to non-limitative examples. The following examples and tables are presented for purposes of illustration only and are not to be construed in a limiting sense.

EXAMPLE 1

In 600 ml of toluene, a charge of 30 g of hydrogenated styrene/butadiene/styrene block copolymer (SEBS) (obtained from Kuraray Company, #S8006, $M_w$=215,000, 33% styrene), and 60 g of mostly amorphous poly(propylene-co-ethylene)(EPR) (Aldrich Chemical Company, $M_w$=21,300 (Polystyrene Standards) and a $T_g$ of −33° C.) was dissolved. A further charge of 10.0 g of poly(2,6-dimethyl-1,4-phenylene ether) (PPO) (Aldrich Chemical Company, Intrinsic Viscosity (I. V.)=0.44) was added and the temperature of the solution was increased to about 90° C. and maintained at this temperature for 45 minutes until all components were dissolved. The product was recovered by drum-drying the polymer solution. Three 0.075"×0.2"×3" slabs of the resultant mixture were molded at 265° C. The molded slabs exhibited excellent molding properties displaying no visible voids and only light shrinkage. The resultant polymer displayed the following physical properties: Shore A hardness of 7.7; Compression Set (C.S.) @70° C.=21%; Tensile strength ($T_b$)=254 psi; Elongation at break ($E_b$)=768%; Compound $T_g$ of −40° C., as well as the following Tan Δ measurements at varying temperatures.

| | |
|---|---|
| Tan Δ @ 20° C. | 0.36 |
| Tan Δ @ 40° C. | 0.30 |
| Tan Δ @ 60° C. | 0.25 |
| Tan Δ @ 80° C. | 0.20 |

EXAMPLES 2 TO 6

The procedure of Example 1 was used in Examples 2 to 6 utilizing the SEBS, PPO and EPR components of Example 1 in amounts of grams (parts by weight) displayed in Table 1. Tables II and III display the physical properties of the resultant polymer.

TABLE I

| Example No. | SEBS | PPO | EPR | % by weight EPR | % by weight SEBS |
|---|---|---|---|---|---|
| 2 | 100 | 15 | 100 | 46.5 | 46.50 |
| 3 | 100 | 50 | 200 | 57 | 28.57 |
| 4 | 100 | 50 | 300 | 66.7 | 22.22 |

TABLE I-continued

| Example No. | SEBS | PPO | EPR | % by weight EPR | % by weight SEBS |
|---|---|---|---|---|---|
| 5 | 100 | 75 | 400 | 69.6 | 17.39 |
| 6 | 100 | 50 | 400 | 72.7 | 18.18 |

TABLE II

| Example No. | ASKER C | SHORE A | C.S. @70° C. | C.S. @100° C. | Eb (%) | Tb (psi) |
|---|---|---|---|---|---|---|
| 2 | 55 | 27 | 15 | 50 | 645 | 364 |
| 3 | 55 | 26 | 29 | NA | 498 | 163 |
| 4 | 44 | 18 | 41 | NA | 466 | 110 |
| 5 | 33 | 12 | 20 | 57 | 702 | 130 |
| 6 | 30 | 10 | 25 | 61 | 730 | 136 |

TABLE III

| Example No. | TAN Δ @ 20° C. | TAN Δ @ 40° C. | TAN Δ @ 60° C. | TAN Δ @ 80° C. |
|---|---|---|---|---|
| 2 | 0.28 | 0.23 | 0.21 | 0.17 |
| 3 | 0.35 | 0.32 | 0.29 | 0.25 |
| 4 | 0.39 | 0.35 | 0.32 | 0.26 |
| 5 | 0.45 | 0.41 | 0.35 | 0.29 |
| 6 | 0.47 | 0.43 | 0.38 | 0.31 |

Although the invention has been described with reference to particular means, materials and embodiments it is to be understood that the invention is not limited to the particulars disclosed and extends to all equivalents within the scope of the claims.

We claim:

1. A composition having a compression set (at 100° C. for 22 hours) of 65% or less as rubber, comprising:
   (a) 100 parts by weight of a hydrogenated block copolymer obtained by hydrogenating a block copolymer comprising at least two polymer blocks composed mainly of a vinyl-substituted aromatic hydrocarbon and at least one polymer block B composed mainly of a conjugated diene,
   (b) 10 to 150 parts by weight of a polymer selected from the group consisting of a homopolymeric polyphenylene ether resin, a copolymeric polyphenylene ether resin and combinations thereof, comprising a binding unit represented by the general formula,

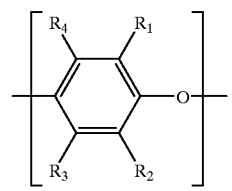

wherein $R_1$, $R_2$, $R_3$ and $R_4$, which may be the same or different, represent substituents selected from the group consisting of hydrogen, halogen, hydrocarbon groups and substituted hydrocarbon groups, and
   (c) 10 to 500 parts by weight of a substantially amorphous polyolefin or hydrogenated polydiene.

2. The composition according to claim 1, wherein the hydrogenated block copolymer (a) is one produced by hydrogenating a block copolymer which comprises two or more polymer blocks A composed mainly of a vinyl-substituted aromatic hydrocarbon and two or more polymer blocks B composed mainly of a conjugated diene and in which at least one polymer block B is arranged at the end of the polymer chains and the content of the vinyl-substituted aromatic hydrocarbon bonded is 10 to 50 wt. %, thereby reducing the content of the unsaturated bond of the polymer block B after hydrogenation to 20 mole % or less of that of the polymer block B before hydrogenation.

3. The composition according to claim 1, wherein the hydrogenated block copolymer (a) is a hydrogenated product of a block copolymer having a B-A-B-A structure.

4. The composition according to claim 1, wherein the hydrogenated block copolymer (a) is produced by hydrogenating a block copolymer which comprises at least two terminal blocks A composed mainly of a vinyl-substituted aromatic hydrocarbon and at least one mid-block B composed mainly of a conjugated diene and in which the content of the vinyl-substituted aromatic hydrocarbon bonded is 10 to 50 wt. %, thereby reducing the content of the unsaturated bond of the polymer block B after hydrogenation to 20 mole % or less of that of the polymer block B before hydrogenation.

5. The composition according to claim 1, wherein the hydrogenated block copolymer (a) is a hydrogenated product of a block copolymer having an A-B-A structure.

6. The composition according to claim 1, wherein the hydrogenated block copolymer (a) is produced by hydrogenating a block copolymer which has a structure of $(A-B)_{(m)}X$, $(B-A-B)_{(m)}X$ or mixture thereof wherein X represents a coupling agent having two or more functional groups or a polyfunctional initiator residue and m represents an integer of 2 or more, and in which the content of the vinyl-substituted aromatic hydrocarbon bonded is 10 to 50 wt. %, thereby reducing the content of the unsaturated bond of the polymer block B after hydrogenation to 20 mole % of less of the polymer block B before hydrogenation.

7. The composition according to claim 1, wherein the hydrogenated block copolymer (a) is a hydrogenated product of a block copolymer comprising a polymer block A composed mainly of a vinyl-substituted aromatic hydrocarbon and a polymer block B composed mainly of a material selected from the group consisting of butadiene, isoprene and a combination thereof.

8. The composition according to claim 7, wherein the polymer block A composed mainly of a vinyl-substituted aromatic hydrocarbon, which is one component of the hydrogenated block copolymer (a), is one composed mainly of styrene.

9. The composition according to claim 1, wherein the hydrogenated block copolymer (a) is a hydrogenated product of a block copolymer in which the number average molecular weight is 3 100,000 to 500,000 and the amount of 1,2-vinyl bond in the polymer block B composed mainly of butadiene is 25 to 65 mole %.

10. The composition according to claim 1, wherein the polyphenylene ether resin (b) is poly(2,6-dimethyl-1,4-phenylene) ether, a copolymer of 2,6-dimethylphenol with 2,3,6-trimethylphenol or mixture thereof.

11. The composition according to claim 1, wherein said composition contains 100 to 400 parts by weight of the substantially amorphous polyolefin per 100 parts by weight of the hydrogenated block copolymer.

12. The composition according to claim 1, wherein said substantially amorphous polyolefin has less than 10% by weight of crystallinity.

13. The composition according to claim 1, wherein said substantially amorphous polyolefin is formed from copolymerized monomers of ethylene and alpha-olefins.

14. The composition according to claim 1, wherein said substantially amorphous polyolefin is formed from copolymerized monomers of ethylene and propylene.

15. A composition having a compression set (at 100° C. for 22 hours) of 65% or less as rubber, comprising:
(a) 100 parts by weight of a hydrogenated block copolymer obtained by hydrogenating a block copolymer comprising at least two polymer blocks composed mainly of a vinyl-substituted aromatic hydrocarbon and at least one polymer block B composed mainly of a conjugated diene,
(b) 10 to 150 parts by weight of a polymer selected from the group consisting of a homopolymeric polyphenylene ether resin, a copolymeric polyphenylene ether resin and combinations thereof comprising a binding unit represented by the general formula,

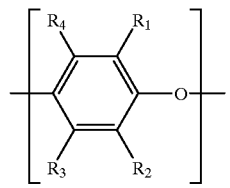

wherein $R_1$, $R_2$, $R_3$, and $R_4$, which may be the same or different, represent substituents selected from the group consisting of hydrogen, halogen, hydrocarbon groups, and substituted hydrocarbon groups, and
(c) 10 to 500 parts by weight of a substantially amorphous polyolefin or hydrogenated polydiene, which is formed from copolymerized monomers of ethylene, propylene, and at least one monomer selected from the group consisting of 1,4-hexadiene and 5-ethylidene-2-norbornene.

16. The composition according to claim 1, wherein said substantially amorphous polyolefin has a weight average molecular weight using polystyrene constant of between 5,000 and 60,000.

17. The composition according to claim 1, further comprising inorganic fillers, flame retardants, glass fibers, carbon fibers, antioxidants, ultraviolet absorbers, hindered amine type light stabilizers, electroconductive fillers, reinforcing resins, paraffinic oils or coloring agents.

18. A composition having a compression set (JIS K 6301 at 100° C. for 22 hours) of 65 % or less as rubber, comprising:
(a) 100 parts by weight of a hydrogenated block copolymer obtained by hydrogenating a block copolymer comprising at least two polymer blocks composed mainly of a vinyl-substituted aromatic hydrocarbon and at least one polymer block B composed mainly of a conjugated diene,
(b) 10 to 150 parts by weight of a polymer selected from the group consisting of a homopolymeric polyphenylene ether resin, a copolymeric polyphenylene ether resin and combinations thereof, and
(c) 10 to 500 parts by weight of a substantially amorphous polyolefin or hydrogenated polydiene having a weight average molecular weight in the range between 5,000 to 60,000 using polystyrene standards.

19. The composition according to claim 18, wherein said substantially amorphous polyolefin has less than 10% by weight of crystallinity.

20. The composition according to claim 18, wherein said substantially amorphous polyolefin is formed from copolymerized monomers of ethylene and alpha-olefins.

21. The composition according to claim 18, wherein said substantially amorphous polyolefin is formed from copolymerized monomers of ethylene and propylene.

22. The composition according to claim 18 wherein the hydrogenated block copolymer is a hydrogenated styrene/butadiene/styrene block copolymer.

23. The composition according to claim 18, wherein the polyphenylene ether resin (b) is poly(2,6-dimethyl-1,4-phenylene) ether, a copolymer of 2,6-dimethylphenol with 2,3,6-trimethylphenol or mixture thereof.

24. A method for forming a soft gel composition comprising: blending a hydrogenated block copolymer, a polyphenylene ether and a substantially amorphous polyolefin having a weight average molecular weight in the range between 5,000 and 60,000 blended in respective proportions sufficient to provide the composition with a Shore A hardness of 30 or less, and a service temperature of up to about 150° C.

* * * * *

UNITED STATES PATENT AND TRADEMARK OFFICE
CERTIFICATE OF CORRECTION

PATENT NO. : 6,184,292 B1
DATED : February 6, 2001
INVENTOR(S) : James E. Hall, et al.

Page 1 of 1

It is certified that error appears in the above-identified patent and that said Letters Patent is hereby corrected as shown below:

Column 11,
Line 54, "3 100,000" should be changed to -- 100,000 --.

Column 12,
Line 38, "norbomene" should be changed to -- norbornene --.

Signed and Sealed this

Thirtieth Day of October, 2001

Attest:

NICHOLAS P. GODICI
Attesting Officer       Acting Director of the United States Patent and Trademark Office